United States Patent [19]

Röhm

[11] Patent Number: 4,844,482
[45] Date of Patent: Jul. 4, 1989

[54] DRILL CHUCK

[76] Inventor: Günter H. Röhm, Heinrich-Röhm-Strasse 50, D-7927 Sontheim, Fed. Rep. of Germany

[21] Appl. No.: 124,310

[22] Filed: Nov. 23, 1987

[30] Foreign Application Priority Data

Nov. 21, 1986 [DE] Fed. Rep. of Germany ....... 3639812

[51] Int. Cl.$^4$ .......................... B23B 5/22; B23B 5/34; E02D 7/02
[52] U.S. Cl. .................................... 279/19; 279/19.3; 279/19.4; 279/19.6; 279/62; 173/48
[58] Field of Search ........................ 279/19, 19.1, 19.2, 279/19.3, 19.4, 19.5, 19.6, 19.7, 14, 62, 60, 61; 173/48, 47

[56] References Cited

U.S. PATENT DOCUMENTS

| 2,016,829 | 10/1935 | Dederer | 173/48 |
| 3,507,337 | 4/1970 | Chromy | 173/48 X |
| 4,434,859 | 3/1984 | Rumpp et al. | 279/19.4 X |
| 4,621,820 | 11/1986 | Rohm | 173/48 X |

FOREIGN PATENT DOCUMENTS 2157217 10/1985 United Kingdom .............. 279/19.3

Primary Examiner—Eugene R. LaRoche
Assistant Examiner—Nathan W. McCutcheon
Attorney, Agent, or Firm—Herbert Dubno

[57] ABSTRACT

The drill chuck has an adapter shaft which is held in the drill chuck nonrotatably with axial motion play and formed for receipt in a tool holder of a hammer drill machine. The hammer action of the adapter shaft is transmittable to the end of a drill held between centrally adjustable clamp jaws through an axial passage. A stop piece is carried in the drill chuck which is movable above the drill chuck axially into a position clamped and locked against the tool holder of the hammer drill machine. Hence axial motion play of the adapter shaft is prevented in both the drill chuck and also in the tool holder and the former is for all intents and purposes rigidly attached with the latter.

13 Claims, 3 Drawing Sheets

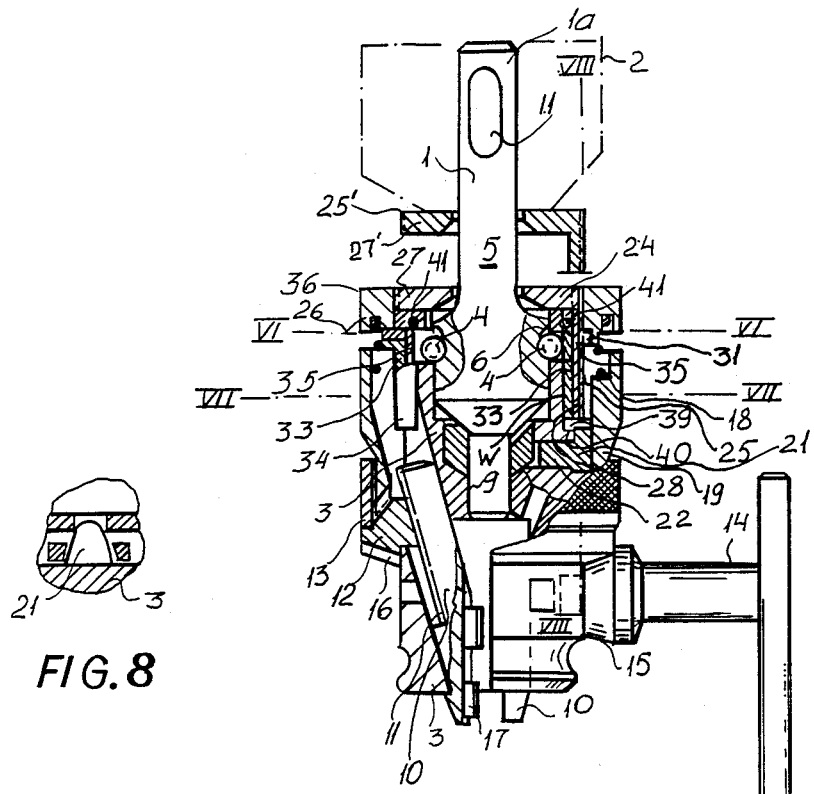
FIG. 8
FIG. 5
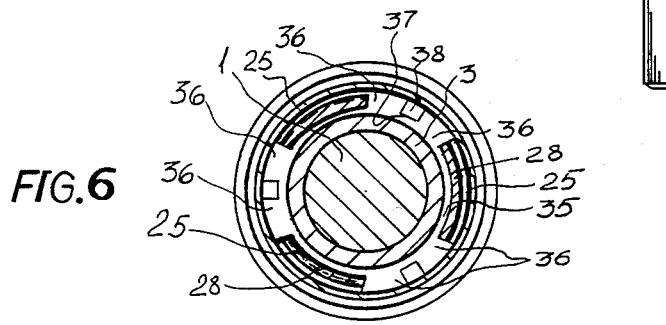
FIG. 6
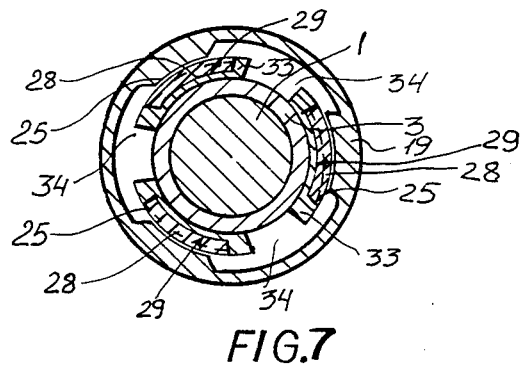
FIG. 7

DRILL CHUCK

FIELD OF THE INVENTION

My present invention relates to a drill chuck and, more particularly, to a drill chuck for a hammer drill.

BACKGROUND OF THE INVENTION

A drill chuck is known having an adapter shaft which is held nonrotatably with axial motion play in the drill chuck and formed for receipt in a tool holder of a hammer drill machine. An axial passage is provided for the adapter shaft through which the hammering action of the adapter shaft is transmittable to the end of a drill held in the drill chuck between centrally adjustable chuck jaws.

Such a drill chuck is described for example in German Open Patent Application No. 28 42 783. It allows other drills to be driven with the hammer drill machine instead of the special drill tools designed to fit the tool holder of the hammer drill machine, since they are held in the drill chuck in adjustable clamp jaws fitting the diameter of the drill shaft. The drill chuck with the adapter shaft is inserted in the tool holder of the hammer drill machine, the end of the adapter shaft being formed like the end of the special drill tools fitting the tool holder of the hammer drill machine. Thus the adapter shaft has an axial motion play limited by a rigid stop not only in the tool holder of the hammer drill machine but also in the drill chuck so that the hammer action of the hammer drill machine can be transmitted as unimpaired as possible through the drill chuck to the drill held axially slidably in the drill chuck. If however only simple rotation of the drill is desired and the drill is to be clamped rigidly between the chuck jaws, the axial motion play of the adapter shaft can be very disturbing because it impairs the precision of the drilling process.

OBJECTS OF THE INVENTION

It is an object of my invention to provide an improved drill chuck, especially for use with the tool holder of a hammer drill machine, which obviates this drawback.

It is also an object of my invention to provide an improved drill chuck, especially for use with the tool holder of a hammer drill machine, in which the axial motion play of the adapter shaft connecting the tool holder and the drill chuck can be switched off or prevented making a practically rigid connection of the drill chuck and the tool holder for drilling with no hammering action.

SUMMARY OF THE INVENTION

These objects and others which will become more readily apparent hereinafter are attained in accordance with my invention in a drill chuck with an adapter shaft which is held nonrotatably with axial motion play in the drill chuck and formed for receipt in a tool holder of a hammer drill machine. The drill chuck is provided with an axial passage through which the hammering action of the adapter shaft is transmittable to the end of a drill held in the drill chuck between centrally adjustable chuck jaws.

According to my invention a stop piece is carried in the drill chuck which is axially slidable out above the end of the drill chuck located adjacent the adapter shaft and is clampable there against the tool holder of the hammer drill machine fitting there under an applied force.

This clamping of the stop piece against the tool holder not only has the consequence that any axial motion play of the adapter shaft in the tool holder and in the drill chuck is eliminated and that both components are practically rigidly connected with each other by the stop piece but also that the adapter shaft in the tool holder is brought into its forward final position fixed by the stop piece which limits the motion play forwardly. Hence, the action of the hammer exerting the hammer action in the hammer drill machine is rendered ineffective even when with only simple drill rotation intended by mistake the hammer action of the machine is not shut off. The stop piece in its clamped position also has a safety augmenting function preventing erroneous operation of the hammer drill machine.

Advantageously, the stop piece which is axially slidable and nonrotatable relative to a chuck body of the drill chuck receiving and guiding the chuck jaws and the adapter shaft engages with an exterior thread in a rotatable and axially nonslidably mounted annular nut. By rotation of the annular nut by hand, the stop piece can be moved and clamped against the tool holder.

Advantageously the stop piece can comprise a circular plate surrounding the adapter shaft and a plurality of guide bars projecting axially from the circular plate which carry the exterior thread and which are slidable in the guide recesses which extend themselves axially along the chuck body and in the circumferential direction between the clamp jaws Hence, good axial guiding conditions are attained for the stop piece since the guide for the guide bars in the drill chuck can be formed of a suitable length and extend between the clamp jaws while the circular plate can cause a particularly suitable guiding on the adapter shaft when the stop piece is moved forwardly from the drill chuck against the tool holder. According to a feature of my invention the guide recesses are formed by guide grooves from which the exterior thread of the guide bars projects radially exteriorly and the annular nut is supported between the guide recesses.

The guide recesses can be formed directly in the chuck body and the annular nut supported on the chuck body between the guide recesses. This example of my invention has the advantage that there are only a few components. However, it has the disadvantage that the chuck body must be subjected to expensive manufacturing steps to make the devices required for mounting the annular nut and the guide recesses in it.

According to another feature of my invention the chuck body carries a nonrotatable axially nonslidable chuck sleeve in which the guide recesses are formed and on which the annular nut is supported. The guide bars are formed from axially parallel segments of a cylinder wall coaxial with the chuck sleeve. The guide recesses and the guide bars inserted in them then can align integrated with the wall of the chuck sleeve. Then the chuck sleeve can be made comparatively simply and economically of plastic by injection molding.

Advantageously the chuck sleeve can be provided with cut out portions for the chuck jaws on the end closest the chuck jaws and in the circumferential direction between the guide recesses so that adjustment of the chuck jaws can not be impaired by the chuck sleeve with the larger sleeve lengths. It is also possible to insert a steel ring free of the guide recesses in the chuck sleeve which is made of plastic on the end of the chuck sleeve furthest from the clamp jaws. The steel ring aligns continuously interiorly with the chuck sleeve and forms a stop for the coupling members connecting the chuck body with the adapter shaft movable radially in the chuck body. The steel ring offers the required surface strength or hardness not to be obtained from the plastic of the chuck body for the stop for the coupling members, chiefly steel balls. Furthermore, the steel ring can very advantageously be called upon for support of the annular nut.

Advantageously a steel ring has a plurality of protruding tongues directed radially exteriorly bent over the edge of the chuck sleeve between the guide recesses on the outer edge of the steel ring which engage in a circular groove provided on the inner side of the annular nut. The annular nut is secured against axial sliding. The tongues can advantageously be positioned side by side pairwise in the circumferential direction and both members of a pair of the tongues form an intervening gap in which a stud located on the chuck sleeve engages so that the steel sleeve can not rotate relative to the chuck sleeve. The chuck sleeve can have recesses for studs on its edge facing the chuck jaws which are fixed in position on the chuck body and the chuck sleeve is fixed in regard to rotation.

BRIEF DESCRIPTION OF THE DRAWING

The above and other objects, features and advantages of my invention will become more readily apparent from the following description, reference being made to the accompanying highly diagrammatic drawing in which:

FIG. 5 is an axial cross sectional view through another embodiment of a drill chuck according to my invention;

FIG. 6 is a transverse cross sectional view through the drill chuck of FIG. 5 taken along the section line VI—VI of FIG. 5;

FIG. 7 is a transverse cross sectional view through the chuck of FIG. 5 taken along the section line VII—VII of FIG. 5;

FIG. 8 is a longitudinal cross sectional view of the drill chuck of FIG. 5 taken along the section line VIII—VIII of FIG. 5.

SPECIFIC DESCRIPTION

Figures 1, 2, 3, 4:
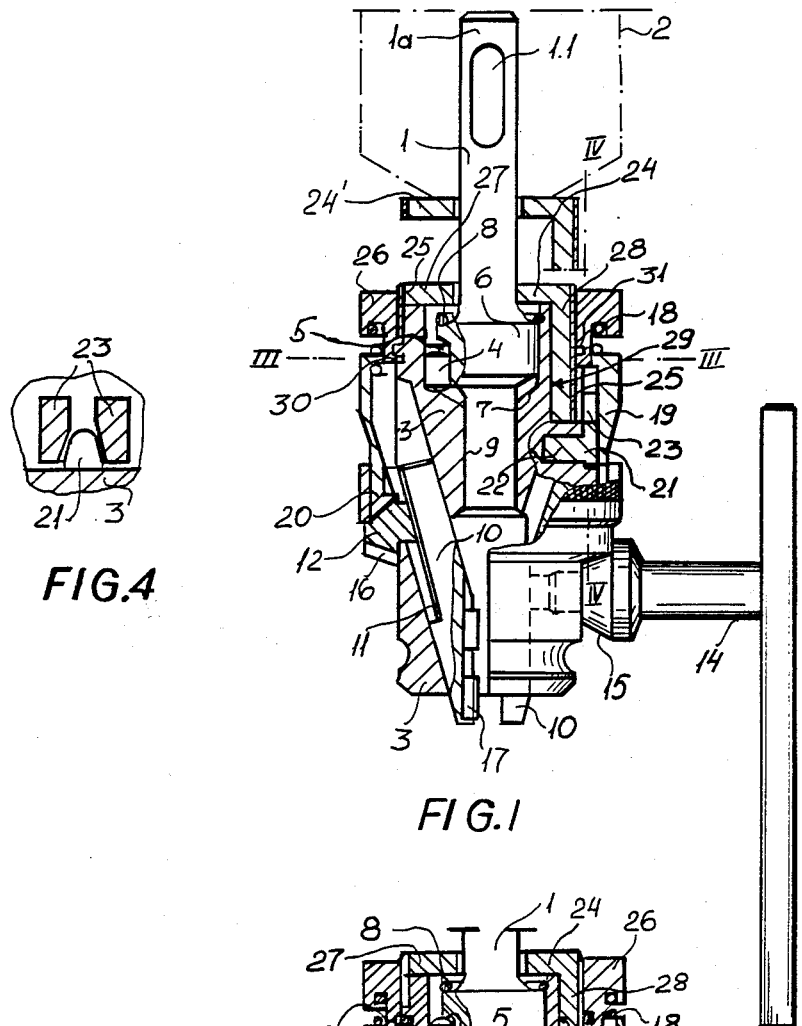
FIG. 1 is an axial cross sectional view of a drill chuck according to my invention.
FIG. 2 is a partial axial cross sectional view of another embodiment of a drill chuck according to my invention.
FIG. 3 is a transverse cross sectional view of the object shown in FIG. 1 taken along the section lines III—III in FIG. 1.
FIG. 4 is a partially broken away longitudinal cross sectional view of the chuck shown in FIG. 1.
Figure 9:
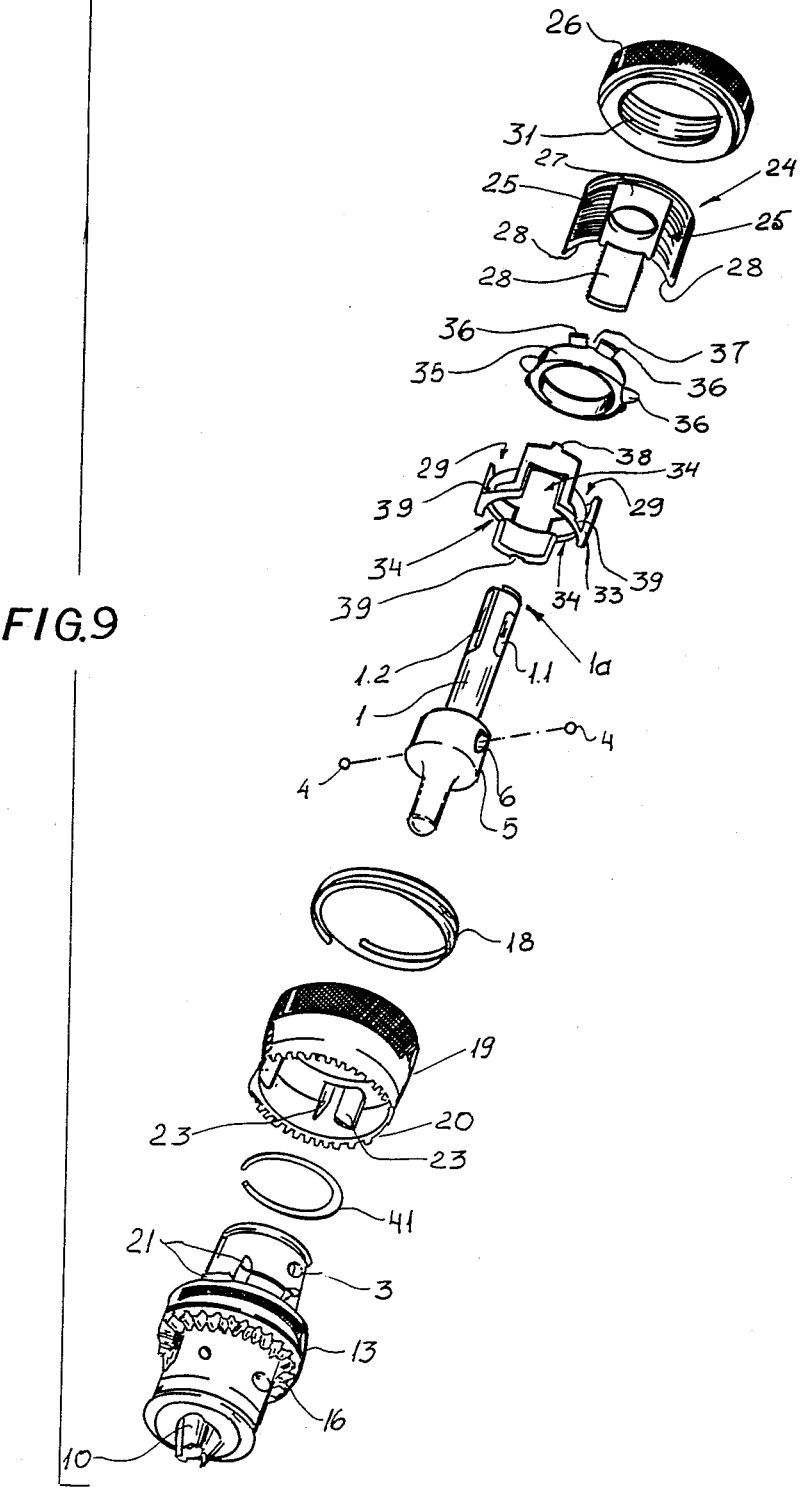
FIG. 9 is an exploded perspective view of some of the components of a drill chuck according to my invention separated axially from each other.

The drill chuck shown in the drawing has an adapter shaft 1 whose free end 1a is formed to be received in a tool holder 2 of an unshown hammer drill machine indicated only with dot-dashed lines in FIGS. 1 to 5.

Furthermore the adapter shaft 1 has two longitudinal grooves 1.1 diametrically opposed to each other closed at both ends and two similar diametrically opposed longitudinal grooves 1.2 displaced approximately 90° relative to the first grooves 1.1 which extend to the end 1a of the adapter shaft 1 and are open at the end 1a of this adapter shaft 1.

These latter longitudinal grooves 1.2 act to facilitate the nonrotatability of the adapter shaft 1 in the tool holder 2, while the longitudinal grooves 1.1 closed at both ends allow the adapter shaft 1a a limited axial motion play bounded by both ends of the longitudinal grooves 1.1. The locking engagement in the longitudinal grooves 1.1 and 1.2 and/or the radially adjustable locking members of the tool holder 2 are known in detail and need no further description.

The adapter shaft 1 is nonrotatable and held with axial sliding play also in the drill chuck which is attained in this example because coupling members 4 are provided in a chuck body 3 receiving the adapter shaft 1 which engage in axial grooves 6 in a collar 5 of the adapter shaft 1 which are axially longer than the coupling members 4 and inspite of the axial sliding play provide for the nonrotatability of the chuck body 3 on the adapter shaft 1.

The axial sliding play of the adapter shaft 1 in the chuck body 3 is limited on the one hand by a stop ring 8 for the collar 5 of the adapter shaft 1 embedded in the chuck body 3 and on the other hand by a ring shaped contacting surface 7 of the chuck body 3. In the embodiment of FIG. 5, by contrast, the coupling members 4 are held axially unslidably in the chuck body 3 so that both axial ends of the grooves 6 limit the axial motion play of the adapter shaft 1.

In all cases the chuck body 3 has an axial passage 9, through which is transmittable the impact of the adapter shaft 1 on the end of a drill unshown in the drawing which is held in the drill chuck between centrally adjustable clamp jaws. The chuck jaws 10 are guided inclined to the chuck axis in the chuck body 3 and have gear teeth 11 which engage rotatably in an interior thread of a tightening ring 12 mounted rotatably and axially unslidably in the chuck body 3. This tightening ring 12 comprises two ring halves which are combined with each other by a tightening sleeve 13.

To clamp the drill rigidly between the clamp jaws 10 and to simply rotate the drill, a key 14 which engages with a pinion 15 in a toothed rim 16 of the tightening ring 12 can be inserted in the chuck body 10. In contrast, the drill is guided axially slidably between the chuck jaws 10 for hammer drilling.

To prevent unnecessary wear on the clamp jaws 10, the clamp jaws 10 are equipped on their clamping surfaces with hardened metal inserts 17. To prevent in this way an automatic rotation of the tightening ring 12 and, hence, an unintended sliding of the clamp jaws 10 a locking sleeve 19 is provided guided slidably axially against the pressure of a spring 18 nonrotatably in the chuck body 3. Sleeve 19 carries gear teeth 20 on its edge facing the tightening ring 12.

The locking sleeve 19 engages under the pressure of spring 18 in an opposing set of gear teeth of tightening ring 12. Tightening ring 12 and the locking sleeve 19 are thereby joined in locking engagement with each other.

However, this locking engagement can not prevent an intended rotation of the tightening ring 12 directly manually or with the aid of the key 14, since in this case the locking sleeve 19 is force out of engagement against the force of the spring 18 by the inclined gear teeth sides.

The securing of the locking sleeve 19 in regard to rotation occurs by catches 21 which are formed on the bolts 22 which are radially inserted in passages of the chuck body 3.

Two stop pieces 23 positioned on both sides of each catch 21, which do not prevent the axial sliding of the locking sleeve 19, are provided on the inside of the locking sleeve 19.

To prevent axial play of the adapter shaft 1 both in the chuck body 3 and in the tool holder 2 of the hammer drill machine, a stop piece 24 is guided in the drill chuck which is slidable axially cut above the end of the drill chuck, is found on the side of the adapter shaft 1 and is clampable against the tool holder 2 of the hammer drill machine tensionally locked and engaged with the tool holder 2. The latter position of the stop piece 24 and 25', respectively, is indicated however with 24' in FIGS. 1 and 5. Also both FIGS. 1 and 5 show the position of the stop piece 24 completely inserted in the drill chuck. The stop piece 24 is axially slidable in regard to the chuck body 3 and is nonrotatably. It engages with an exterior thread 25 in an annular nut 26 operable by hand exteriorly rotatable but axially unshiftable in regard to the chuck body 3.

The stop piece 24 comprises a circular plate 27 surrounding the adapter shaft 1 and axially extended guide bars 28 extending from the side facing away from the tool holder 2 which carry the exterior threads 25 and which are slidable into the guide recesses 29 which extend axially along the chuck body 3 and extend in the circumferential direction between the chuck jaws 10.

These guide recesses 29 are formed by the guide grooves from which the exterior thread 25 of the guide bar 28 projects radially so far that it engages in the annular nut 26 which for its part is seated or bears on surfaces between the guide recesses 29 in the circumferential direction.

In the example according to FIGS. 1 to 4 the guide recesses 29 are formed directly in the chuck body 3. The annular nut 26 is supported on the chuck body 3 between the guide recesses 29.

Furthermore, the chuck body 3 in the case of FIG. 1 is provided with a radially outwardly directed circular projection 30 in the vicinity between the guide recesse 29. Projection 30 which engages inside a circular groove 31 on the inside of the annular nut 26 and which, hence, is secured against axial sliding. Contrastingly, the example according to FIG. 2 shows that opposing circular grooves are provided in the annular nut 26 and also in the chuck body 3 in which a compressible ring 32 engages which has a recess or opening necessary for receiving the exterior thread 25 of the guide bar 28.

Alternatively, in the example according to FIGS. 5 to 9, the chuck body 3 carries a nonrotatable and axially unslidable chuck sleeve 33 on it in which the guide recesses 29 are formed and with whose help the annular nut 26 is supported. The guide bars 28 by axially parallel portions are formed by a cylinder wall w coaxial with the chuck sleeve 33 so that they embed in the guide recesses 29 aligning themselves with the outer surface of the chuck sleeve 33.

On the side facing the chuck jaws 10 and in the circumferential direction between the guide recesses 29, the chuck sleeve 33 is provided with cut out portions 34 for the chuck jaws 10 so that the chuck sleeve 33 can not prevent the adjustment of the chuck jaws 10. The chuck sleeve 33 is made usually from plastic by spray die casting. Then its surface hardness is guaranteed to be insufficient to form the stop required for the coupling member 4.

Thus a steel ring 35, free of the guide recesses 29, which continuously aligns interiorly with the chuck sleeve 33 and forms the stop for the coupling member 4, is inserted in the side facing away from the chuck jaws 10 in the chuck sleeve 33. The steel ring 35 has protruding tongues 36 directed radially exteriorly and bent over the edge of the chuck sleeve 33 between the guide recesses 29 on its outer edge.

These tongues 36 engage in the circular groove 31 provided on the inner side of the annular nut 26 and secure the annular nut 26 from axial sliding.

The tongues 36 are arranged beside each other pairwise in the circumferential direction and form a gap 37 between the two members of a pair in which a stud 38 found on the chuck sleeve 33 engages so that as a result the steel ring 35 is held nonrotatably in the chuck sleeve 33.

On its edge facing the chuck jaws 10, the chuck sleeve 33 has recesses 39 for the catches 21 which thus secures not only the locking sleeve 19 but also the chuck sleeve 33 from rotation. The axial securing of the chuck sleeve 33 is on the one hand attained by a circular collar 40 on the chuck body 3 and on the other hand by a compressible ring 41 inserted in a groove of the chuck body 3 on which the edge of the chuck sleeve 33 and/or of the steel ring 35 supports itself axially.

When the stop piece 24 is pushed from the position inserted completely in the drill chuck axially relative to the tool holder 2 into the position indicated with 24' and held against the tool holder 2, the drill chuck is pressed axially away from the tool holder 2 until the adapter shaft 1 contacts both in the drill chuck and also in the tool holder 2 on the corresponding stop limiting its axial motion play—which thus means that the adapter shaft 1 is pulled out to the maximum extent from the tool holder 2 and/or the drill chuck. As a result, hence, not only the drill chuck and the tool holder are connected as it were rigidly with each other but also the adapter shaft 1 is brought into the tool holder 2 also from the impacting vicinity of the hammer so that in this operating state no impacts or blows can fall on the adapter shaft 1 when because of operator error the hammer drill machine is not shut off and the hammer continues to exert its hammer blows.

I claim:

1. In a drill chuck with an adapter shaft which is held nonrotatably with axial motion play in said drill chuck and formed for receipt in a tool holder of a hammer drill machine, said drill chuck being provided with an axial passage through which the hammering action of said adapter shaft is transmittable to the end of a drill held in said drill chuck between a plurality of centrally adjustable chuck jaws, the improvement wherein a stop piece is carried in said drill chuck which is axially slidable out above the end of said drill chuck located adjacent said adapter shaft and is clampable there against said tool holder of said hammer drill machine fitting there under an applied force.

2. The improvement defined in claim 1 wherein said stop piece is axially slidable and nonrotatable relative to a chuck body of said drill chuck receiving and guiding said chuck jaws and said stop piece includes an exterior thread which engages with a rotatable and axially nonslidably mounted annular nut.

3. In a drill chuck with an adapter shaft which is held nonrotatably with axial motion play in said drill chuck and formed for receipt in a tool holder of a hammer drill machine, said drill chuck being provided with an axial passage through which the hammering action of said adapter shaft is transmittable to the end of a drill held in said drill chuck between a plurality of centrally adjustable chuck jaws, the improvement wherein a stop piece is carried in said drill chuck which is axially slidable out above the end of said drill chuck located adjacent said adapter and is clampable there against said tool holder of said hammer drill machine fitting there under an applied force, said stop piece is axially slidable and nonrotatable relative to a chuck body of said drill chuck receiving and guiding said chuck jaws, said stop piece includes an exterior thread which engages with a rotatable and axially nonslidably mounted annular nut, and said stop piece comprises a circular plate surrounding said adapter shaft and a plurality of guide bars projecting axially from said circular plate which carry said exterior thread and which are slidable in a plurality of guide recesses which extend themselves axially along said chuck body and in the circumferential direction between said clamp jaws.

4. The improvement defined in claim 3 wherein said guide recesses are formed by a plurality of guide grooves from which said exterior thread of said guide bars projects radially exteriorly and said annular nut is supported between said guide recesses.

5. The improvement defined in claim 4 wherein said guide recesses are formed directlyl in said chuck body and said annular nut is supported on said chuck body between said guide recesses.

6. The improvement defined in claim 4 wherein said chuck body carries a nonrotatably axially nonslidable chuck sleeve in which said guide recesses are formed and on which said annular nut is supported and said guide bars are formed from axially parallel segments of a cylinder wall coaxial with said chuck sleeve.

7. The improvement defined in claim 6 wherein said chuck sleeve has cut out portions for said chuck jaws on the end closest said clamp jaws and in said circumferential direction between said guide recesses.

8. The improvement defined in claim 6 wherein a steel ring free of said guide recesses is inserted in said chuck sleeve which is made of plastic on the end furthest from said chuck jaws, said steel ring being continuously aligned with said chuck sleeve and forming a stop for a plurality of coupling members connecting said chuck body with said adapte shaft movable radially in said chuck body.

9. The improvement defined in claim 8 wherein sadi steel ring has a plurality of protruding tongues directed radially exteriorly bent over the edge of said chuck sleeve between said guide recesses on the outer edge of said steel ring which engage in a circular groove provided on the inner side of said annular nut.

10. The improvement defined in claim 9 wherein said tongues are positioned side by side pairwise in said circumferential direction and both members of a pair of said tongues form an intervening gap in which a stud located on said chuck sleeve engages.

11. The improvement defined in claim 10 wherein said chuck sleeve has a plurality of recesses in an edge facing said chuck jaws for a plurality of catches which are fixed in position on said chuck body and which secure said chuck sleeve in regard to rotation.

12. A drill chuck for a hammer drill machine comprising:
a chuck body in which a plurality of centrally adjusted chuck jaws are mounted and received;
an adapter shaft which is held nonrotatably with axial motion play in said drill chuck and formed for receipt in a tool holder of said hammer drill machine, said drill chuck being provided with an axial passage through which the hammering action of said adapter shaft is transmittable to the end of a drill held in said chuck jaws;
a nonrotatable stop piece carried in said chuck body which is axially slidable out above the end of said chuck body and positioned adjacent said adapter shaft and which is clampable there against said tool holder of said hammer drill machine fitting there under an applied force, said stop piece comprising a circular plate surrounding said adapter shaft and a plurality of guide bars projecting axially from said circular plate which carry an exterior thread and which are slidable in a plurality of guide recesses which extend themselves axially along said chuck body and in the circumferential direction between said chuck jaws;
a rotatable and axially nonslidably mounted annular nut which is engaged by said stop piece with said exterior thread, said guide recesses being formed by a plurality of guide grooves from which said exterior thread of said guide bars projects radially exteriorly and said annular nut is supported between said guide recesses;
a nonrotatable axially nonslidable chuck sleeve carried by said chuck body in which said guide recesses are formed and on which said annular nut is supported and said guide bars are formed from axially parallel segments of a cylinder wall of said stop piece coaxial with said chuck sleeve, said chuck sleeve having cut out portions for said chuck jaws on the end closest said chuck jaws and in said circumferential direction between said guide recesses; and
a steel ring inserted in said chuck sleeve which is made of plastic at the end of said chuck sleeve furthest from said chuck jaws, said steel ring being continuously aligned with said chuck sleeve and forming a stop for a plurality of coupling members connecting said chuck body with said adapter shaft movable radially in said chuck body, said steel ring having a plurality of protruding tongues directed radially exteriorly bent over the edge of said chuck sleeve between said guide recesses on the outer edge of said steel ring which engage in a circular groove provided on the inner side of said annular nut, said tongues being positioned side by side pairwise in said circumferential direction and both members of a pair of said tongues forming an intervening gap in which a stud connected to said chuck sleeve engages.

13. A drill chuck for a hammer drill machine comprising:
a chuck body in which a plurality of centrally adjusted chuck jaws are mounted and received;
an adapter shaft which is held nonrotatably with axial motion play in said drill chuck and formed for receipt in a tool holder of said hammer drill machine, said drill chuck being provided with an axial passage through which the hammering action of said adapter shaft is transmittable to the end of a drill held in said chuck jaws;
a nonrotatable stop piece carried in said chuck body which is axially slidable out above the end of said chuck body and positioned adjacent said adapter shaft and which is clampable there against said tool holder of said hammer drill machine fitting there unde an applied force, said stop piece comprising a circular plate surrounding said adapter shaft and a plurality of guide bars projecting axially from said circular plate which carry an exterior thread and which are slidable in a plurality of guide recesses which extend axially in said chuck body and in the circumferential direction between said clamp jaws; and a rotatable and axially nonslidably mounted annular nut supported on said chuck body which is engaged by said stop piece with said exterior thread, said guide recesses being formed by a plurality of guide grooves from which said exterior thread of said guide bars projects radially exteriorly and said annular nut is supported between said guide recesses.

* * * * *